United States Patent
Ly et al.

(10) Patent No.: US 11,082,898 B2
(45) Date of Patent: Aug. 3, 2021

(54) RANDOM ACCESS CHANNEL (RACH)-LESS TIMING ADVANCE DETERMINATION

(71) Applicant: QUALCOMM Incorporated, San Diego, CA (US)

(72) Inventors: Hung Dinh Ly, San Diego, CA (US); Joseph Binamira Soriaga, San Diego, CA (US); Wanshi Chen, San Diego, CA (US); Peter Gaal, San Diego, CA (US); Tao Luo, San Diego, CA (US); Ozcan Ozturk, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/794,091

(22) Filed: Feb. 18, 2020

(65) Prior Publication Data

US 2020/0267609 A1  Aug. 20, 2020

Related U.S. Application Data

(60) Provisional application No. 62/808,151, filed on Feb. 20, 2019.

(51) Int. Cl.
*H04W 36/00* (2009.01)
*H04W 56/00* (2009.01)

(52) U.S. Cl.
CPC ..... *H04W 36/0072* (2013.01); *H04W 56/001* (2013.01)

(58) Field of Classification Search
CPC ........................ H04W 36/0072; H04W 56/001
(Continued)

(56) References Cited

U.S. PATENT DOCUMENTS

| | | | |
|---|---|---|---|
| 2015/0223124 A1* | 8/2015 | Wang | H04W 24/08 455/436 |
| 2015/0271723 A1* | 9/2015 | Yang | H04W 36/0077 455/436 |

(Continued)

FOREIGN PATENT DOCUMENTS

WO    2017202267 A1    11/2017

OTHER PUBLICATIONS

Synchronized RACH-less handover solution for LTE heterogeneous networks. Barbera et al. Jun. 2015.*

(Continued)

*Primary Examiner* — William Nealon
(74) *Attorney, Agent, or Firm* — Qualcomm Incorporated

(57) ABSTRACT

This disclosure provides systems, methods and apparatus for determining a target base station timing advance value between a user equipment (UE) and target base station in connection with a random access channel (RACH)-less handover procedure. In one aspect, the UE may determine the target base station's timing advance based at least in part on a timing difference between the target base station and the source base station and based at least in part on a timing offset associated with an uplink and a downlink of the UE. In some aspects, the target base station may determine the timing advance using an uplink reference signal of the UE. In some aspects, the UE may report a timing difference between the target base station and the source base station, and the source cell may determine a timing advance based at least in part on the timing difference.

24 Claims, 12 Drawing Sheets

(58) Field of Classification Search
USPC .......................................................... 455/437
See application file for complete search history.

(56) References Cited

U.S. PATENT DOCUMENTS

| | | | |
|---|---|---|---|
| 2016/0219484 A1* | 7/2016 | Bontu | ............... H04W 36/0072 |
| 2018/0027511 A1* | 1/2018 | Yilmaz | ................ H04L 5/0007 |
| | | | 370/324 |
| 2018/0049079 A1* | 2/2018 | Ozturk | .............. H04W 72/0453 |
| 2018/0213457 A1* | 7/2018 | Tang | .................... H04W 36/08 |

OTHER PUBLICATIONS

Alcatel-Lucent: "RACH-Less Handover in Synchronized Networks", 3GPP Draft; R2-072655_RACH-Less_Handover_in_Synchronized_Networks, 3rd Generation Partnership project (3GPP), Mobile Competence Centre; 650, Route Des Lucioles; F-06921 Sophia-Antipolis Cedex; France, vol. TSG RAN, No. Orlando; Jun. 25, 2007-Jun. 29, 2007, Jun. 22, 2007 (Jun. 22, 2007), XP050603109, 3 pages, [retrieved on Jun. 22, 2007].
International Search Report and Written Opinion—PCT/US2020/018829—ISA/EPO—dated Jun. 12, 2020.

\* cited by examiner

RANDOM ACCESS CHANNEL (RACH)-LESS TIMING ADVANCE DETERMINATION

CROSS-REFERENCE TO RELATED APPLICATION

This patent application claims priority to U.S. Provisional Patent Application No. 62/808,151, filed on Feb. 20, 2019, entitled "RANDOM ACCESS CHANNEL (RACH)-LESS TIMING ADVANCE DETERMINATION," and assigned to the assignee hereof. The disclosure of the prior application is considered part of and is incorporated by reference in this patent application.

TECHNICAL FIELD

Aspects of the present disclosure generally relate to wireless communication, and more particularly to techniques and apparatuses for a random access channel (RACH)-less timing advance determination.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different user equipment to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving information identifying a timing offset associated with uplink (UL) and downlink (DL) communications of the UE. The method may include determining a target base station timing advance value for a handover to a target base station based at least in part on at least one of the information identifying the timing offset, a timing difference between the target base station and a source base station associated with the UE, or a source base station timing advance value associated with the source base station.

In some implementations, the timing difference is based at least in part on a reference signal timing difference between the target base station and the source base station. In some implementations, the method can include determining the timing difference between the target base station and the source base station based at least in part on reference signaling received from the source base station and the target base station. In some implementations, the timing offset is based at least in part on a switching time, a propagation delay between transmit and reception, or a hardware configuration of at least one of the UE, the source base station, or the target base station.

In some implementations, a granularity of the timing offset is based at least in part on at least one of a numerology, or a slot length of the target base station. In some implementations, the information identifying the timing offset is received in a handover command. In some implementations, the target base station timing advance value is determined without performing a random access procedure. In some implementations, the target base station timing advance value is determined based at least in part on the information identifying the timing offset, the timing difference between the target base station and the source base station, and the source base station timing advance value.

Another innovative aspect of the subject matter described in this disclosure can be implemented in an apparatus of a UE for wireless communication. The UE may include memory and one or more processors operatively coupled to the memory. The memory and the one or more processors may be configured to receive information identifying a timing offset associated with UL and DL communications of the UE; and determine a target base station timing advance value for a handover to a target base station based at least in part on at least one of the information identifying the timing offset, a timing difference between the target base station and a source base station associated with the UE, or a source base station timing advance value associated with the source base station. In some aspects, the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive information identifying a timing offset associated with UL and DL communications of the UE; and determine a target base station timing advance value for a handover to a target baes station based at least in part on at least one of the information identifying the timing offset, a timing difference between the target base station and a source base station associated with the UE, or a source base station timing advance value associated with the source base station. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for receiving information identifying a timing offset associated with UL and DL communications of the apparatus; and means for determining a target base station timing advance value for a handover to a target base station based at least in part on at least one of the information identifying the timing offset, a timing difference between the target base station and a source base station associated with the UE, or a source base station timing advance value associated with the source base station. In some aspects, the apparatus may include means for performing or implementing any one or more of the aspects described in connection with the method, above or elsewhere herein.

One innovative aspect of the subject matter described in this disclosure can be implemented in a method of wireless communication performed by an apparatus of a UE. The method may include transmitting at least one of: information identifying a timing difference between a target base station and a source base station associated with a handover, or an uplink reference signal; and receiving information identifying a target base station timing advance value, where the information identifying the target base station timing advance value is based at least in part on the timing difference between the target base station and the source base station or the uplink reference signal.

In some implementations, the handover is performed without performing a random access procedure. In some implementations, the information identifying the timing difference between the target base station and the source base station is a quantization of the timing difference between the target base station and the source base station. In some implementations, the information identifying the timing difference between the target base station and the source base station is provided in a radio resource management report. In some implementations, the uplink reference signal includes a sounding reference signal.

Another innovative aspect of the subject matter described in this disclosure can be implemented in an apparatus of a UE for wireless communication. The UE may include memory and one or more processors operatively coupled to the memory. The memory and the one or more processors may be configured to transmit at least one of: information identifying a timing difference between a target base station and a source base station associated with a handover, or an uplink reference signal; and receive information identifying a target base station timing advance value, where the information identifying the target base station timing advance value is based at least in part on the timing difference between the target base station and the source base station or the uplink reference signal. In some aspects, the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to transmit at least one of: information identifying a timing difference between a target base station and a source base station associated with a handover, or an uplink reference signal; and receive information identifying a target base station timing advance value, where the information identifying the target base station timing advance value is based at least in part on the timing difference between the target base station and the source base station or the uplink reference signal. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for transmitting at least one of: information identifying a timing difference between a target base station and a source base station associated with a handover, or an uplink reference signal; and receiving information identifying a target base station timing advance value, where the information identifying the target base station timing advance value is based at least in part on the timing difference between the target base station and the source base station or the uplink reference signal. In some aspects, the apparatus may include means for performing or implementing any one or more of the aspects described in connection with the method, above or elsewhere herein.

Another innovative aspect of the subject matter described in this disclosure can be implemented in a method of wireless communication performed by an apparatus of a target base station. The method may include receiving, from a UE, at least one of: information identifying a timing difference between the apparatus of the target base station and a source base station, where the apparatus of the target base station and the source base station are associated with a handover of the UE, or an uplink reference signal; and providing, to the UE, information identifying a target base station timing advance value, where the target base station timing advance value is based at least in part on the information identifying the timing difference or the uplink reference signal.

In some implementations, the information identifying the timing difference between the apparatus of the target base station and the source base station is a quantization of the timing difference between the apparatus of the target base station and the source base station. In some implementations, the information identifying the timing difference between the apparatus of the target base station and the source base station is received in a radio resource management report. In some implementations, the uplink reference signal includes a sounding reference signal. In some implementations, the method can include determining the target base station timing advance value based at least in part on the information identifying the timing difference between the apparatus of the target base station and the source base station or the uplink reference signal.

In some implementations, the method can include selecting a technique for determining the target base station timing advance value based at least in part on the information identifying the timing difference between the apparatus of the target base station and the source base station or the uplink reference signal. In some implementations, the technique is selected from a plurality of techniques including at least one of: determining the target base station timing advance value as zero, determining the target base station timing advance value in accordance with a source base station timing advance value associated with the source base station, or determining the target base station timing advance value using the uplink reference signal.

In some implementations, the method may include providing the information identifying the target base station timing advance value to the source base station to be transmitted to the UE. In some implementations, the handover is performed without performing a random access procedure.

Another innovative aspect of the subject matter described in this disclosure can be implemented in an apparatus of a target base station for wireless communication. The BS may include memory and one or more processors operatively coupled to the memory. The memory and the one or more processors may be configured to receive, from a UE, at least one of: information identifying a timing difference between the target base station and a source base station, where the target base station and the source base station are associated with a handover, or an uplink reference signal; and provide, to the UE, information identifying a target base station timing advance value aw the target base station, where the target base station timing advance value is based at least in part on the information identifying the timing difference or the uplink reference signal. In some aspects, the target base station may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a target base station, may cause the one or more processors to receive, from a UE, at least one of: information identifying a timing difference between the target base station and a source base station, where the target base station and the source base station are associated with a handover, or an uplink reference signal; and provide, to the UE, information identifying a target base station timing advance value associated with the target base station, where the target base station timing advance value is based at least in part on the information identifying the timing difference or the uplink reference signal. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for receiving, from a UE, at least one of: information identifying a timing difference between the apparatus and a source base station, where the apparatus and the source base station are associated with a handover, or an uplink reference signal; and means for providing, to the UE, information identifying a target base station timing advance value associated with the apparatus, where the target base station timing advance value is based at least in part on the information identifying the timing difference or the uplink reference signal. In some aspects, the apparatus may include means for performing or implementing any one or more of the aspects described in connection with the method, above or elsewhere herein.

Another innovative aspect of the subject matter described in this disclosure can be implemented in a method of wireless communication performed by an apparatus of a source base station. The method may include determining a timing offset of a UE, where the timing offset is based at least in part on a difference between a downlink propagation delay and an uplink propagation delay of the UE; and transmitting, to the UE in connection with a handover of the UE from the apparatus of the source base station to a target base station, information identifying the timing offset.

In some implementations, the timing offset is based at least in part on a switching time, a propagation delay between transmit and reception, or a hardware configuration of at least one of the UE, the apparatus of the source base station, or the target base station. In some implementations, the information identifying the timing offset is transmitted in connection with a handover command. In some implementations, a granularity of the timing offset is based at least in part on a numerology or a slot length of the target base station.

Another innovative aspect of the subject matter described in this disclosure can be implemented in an apparatus of a source base station for wireless communication. The source base station may include memory and one or more processors operatively coupled to the memory. The memory and the one or more processors may be configured to determine a timing offset of a UE, where the timing offset is based at least in part on a difference between a downlink propagation delay and an uplink propagation delay of the UE; and transmit, to the UE in connection with a handover of the UE from the apparatus of the source base station to a target base station, information identifying the timing offset. In some aspects, the source base station may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a source base station, may cause the one or more processors to determine a timing offset of a UE, where the timing offset is based at least in part on a difference between a downlink propagation delay and an uplink propagation delay of the UE; and transmit, to the UE in connection with a handover of the UE from the source base station to a target base station, information identifying the timing offset. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for determining a timing offset of a UE, where the timing offset is based at least in part on a difference between a downlink propagation delay and an uplink propagation delay of the UE; and means for transmitting, to the UE in connection with a handover of the UE from the apparatus to a target base station, information identifying the timing offset. In some aspects, the apparatus may include means for performing or implementing any one or more of the aspects described in connection with the method, above or elsewhere herein.

Another innovative aspect of the subject matter described in this disclosure can be implemented in a method of wireless communication performed by an apparatus of a source base station. The method may include receiving, from a UE, information identifying a timing difference between the apparatus of the source base station and a target base station of a handover of the UE, wherein the timing difference between the apparatus of the source base station and the target base station is associated with a handover of the UE; and transmitting information identifying a target base station timing advance value based at least in part on the information identifying the timing difference between the apparatus of the source base station and the target base station.

In some implementations, the information identifying the timing difference between the apparatus of the source base station and the target base station is a quantization of the timing difference. In some implementations, the information identifying the timing difference between the apparatus of the source base station and the target base station is received in a radio resource management report. In some implementations, the information identifying the target base station timing advance value is transmitted in connection with a handover command.

In some implementations, the method may include determining the target base station timing advance value based at least in part on the information identifying the timing difference between the apparatus of the source base station and the target base station. In some implementations, the method may include selecting a technique for determining the target base station timing advance value based at least in part on the information identifying the timing difference between the apparatus of the source base station and the target base station. In some implementations, the technique is selected from a plurality of techniques including at least one of determining the target base station timing advance value as zero, determining the target base station timing advance value in accordance with a source base station timing advance value associated with the source base station, or determining the target base station timing advance value using an uplink reference signal.

Another innovative aspect of the subject matter described in this disclosure can be implemented in an apparatus of a source base station for wireless communication. The source base station may include memory and one or more processors operatively coupled to the memory. The memory and the one or more processors may be configured to receive, from a UE, information identifying a timing difference between the source base station and a target base station, wherein the timing difference between the apparatus of the source base station and the target base station is associated with a handover of the UE; and transmit information identifying a target base station timing advance value based at least in part on the information identifying the timing difference between the apparatus of the source base station and the target base station. In some aspects, the source base station may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a source base station, may cause the one or more processors to receive, from a UE, information identifying a timing difference between the source base station and a target base station, wherein the timing difference between the apparatus of the source base station and the target base station is associated with a handover of the UE; and transmit information identifying a target base station timing advance value based at least in part on the information identifying the timing difference between the apparatus of the source base station and the target base station. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for receiving, from a UE, information identifying a timing difference between the apparatus and a target base station, wherein the timing difference between the apparatus of the source base station and the target base station is associated with a handover of the UE; and transmitting information identifying a target base station timing advance value based at least in part on the information identifying the timing difference between the apparatus of the source base station and the target base station. In some aspects, the apparatus may include means for performing or implementing any one or more of the aspects described in connection with the method, above or elsewhere herein.

Aspects generally include a method, apparatus, system, computer program product, non-transitory computer-readable medium, user equipment, base station, wireless communication device, and processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
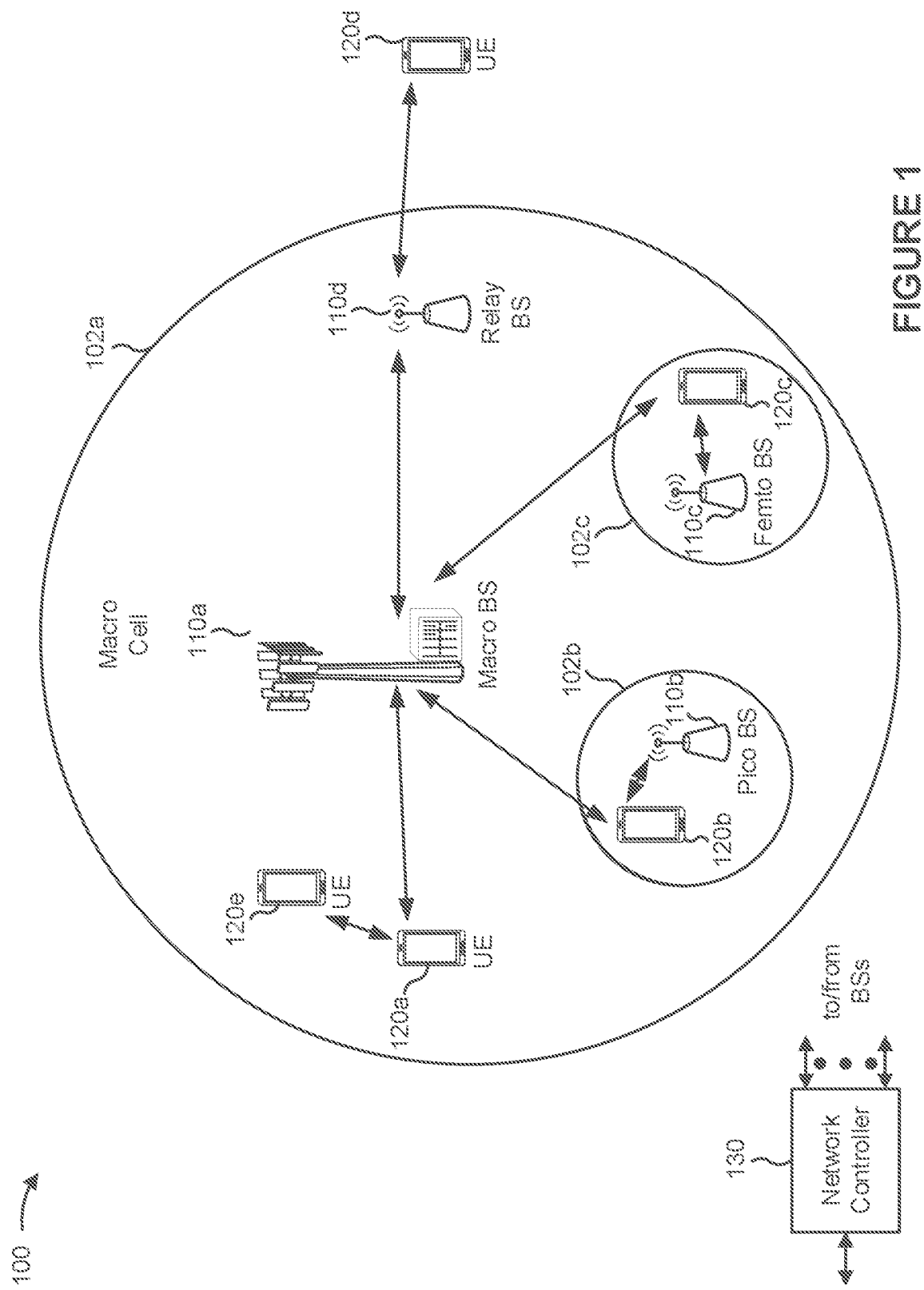
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A base station (BS) and a user equipment (UE) may be associated with a timing advance or a transmission timing adjustment. "Timing advance," "transmission timing adjustment," and "timing advance value" may be used interchangeably herein. The timing advance may identify a timing offset between the UE and the base station based at least in part on propagation delay or other factors. For example, a timing advance may identify a negative offset, at the UE, between the start of a received downlink subframe and a transmitted uplink subframe. This offset at the UE may ensure that the downlink and uplink subframes are synchronized at the base station.

A handover is a procedure by which a UE is transferred from one cell (referred to as a source cell, where service may be provided by a source base station) to another cell (referred to as a target cell, where service may be provided by a target base station). Some handovers are performed using a random access channel (RACH) procedure (such as a contention-based RACH procedure or a contention-free RACH procedure), where the UE performs a RACH procedure with a target base station. In a RACH-based handover, the target base station may determine a timing advance for the UE (relative to the target base station) based at least in part on the RACH procedure, and may indicate the timing advance to the UE as part of the RACH procedure.

Some handovers may be performed without using a RACH procedure. This may eliminate RACH-related latency in the handover, thereby reducing mobility interruption time in proportion to the length of the RACH procedure (such as approximately 10-12 milliseconds (ms) in some cases). It may be beneficial to determine a target base station timing advance value between the UE and the target base station using a non-RACH-based technique, since the target base station may not be able to use the RACH procedure to determine the timing advance. In some deployments, RACH-less handover has been restricted to synchronous deployments, or has been subject to various restrictions (such as setting the target base station's timing advance to be equal to the source cell's timing advance, or setting the target base station's timing advance to be zero, etc.).

Some techniques and apparatuses described herein provide determination of a target base station timing advance value between a UE and target base station, such as in connection with a RACH-less handover procedure. For example, at least one of the UE, the target base station, or the source base station may determine the target base station timing advance value without using a RACH procedure. In some aspects, the UE may determine the target base station's timing advance based at least in part on a timing difference between the target base station and the source base station and based at least in part on a timing offset associated with an uplink and a downlink of the UE. In some aspects, the target base station may determine the timing advance using an uplink reference signal of the UE. In some aspects, the UE may report a timing difference between the target base station and the source base station, and the source cell may determine a timing advance based at least in part on the timing difference. In some aspects, the UE may report a timing difference between the target base station and the source base station, and a base station (such as the source base station or the target base station) may determine a technique for determining the timing advance based at least in part on the timing difference. These techniques may be performed in various deployments irrespective of whether the target base station's timing advance is equal to the source base station's timing advance or is zero.

Particular implementations of the subject matter described in this disclosure can be implemented to realize one or more of the following potential advantages. In some implementations, UE mobility is improved. Furthermore, interruption associated with a handover may be reduced through reduced handover latency. Still further, support for a RACH-less handover may be improved for base stations that do not share a same timing advance value and for base stations associated with non-zero timing advance values (such as base stations that provide large cells).

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A timing advance value for a BS may be expected to increase as the size of a cell provided by the BS increases. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station also may be referred to as a relay BS, a relay base station, or a relay.

Wireless network 100 may be a heterogeneous network that includes BSs of different types, for example, macro BSs, pico BSs, femto BSs, relay BSs, and so on. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120*a*, 120*b*, 120*c*) may be dispersed throughout wireless network 100, and each UE may be stationary or mobile. A UE also may be referred to as an access terminal, a terminal, a mobile station, a subscriber unit, a station, or similar terms. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or similar examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, or a wireless communication technology. A frequency also may be referred to as a carrier, a channel, or a frequency channel. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
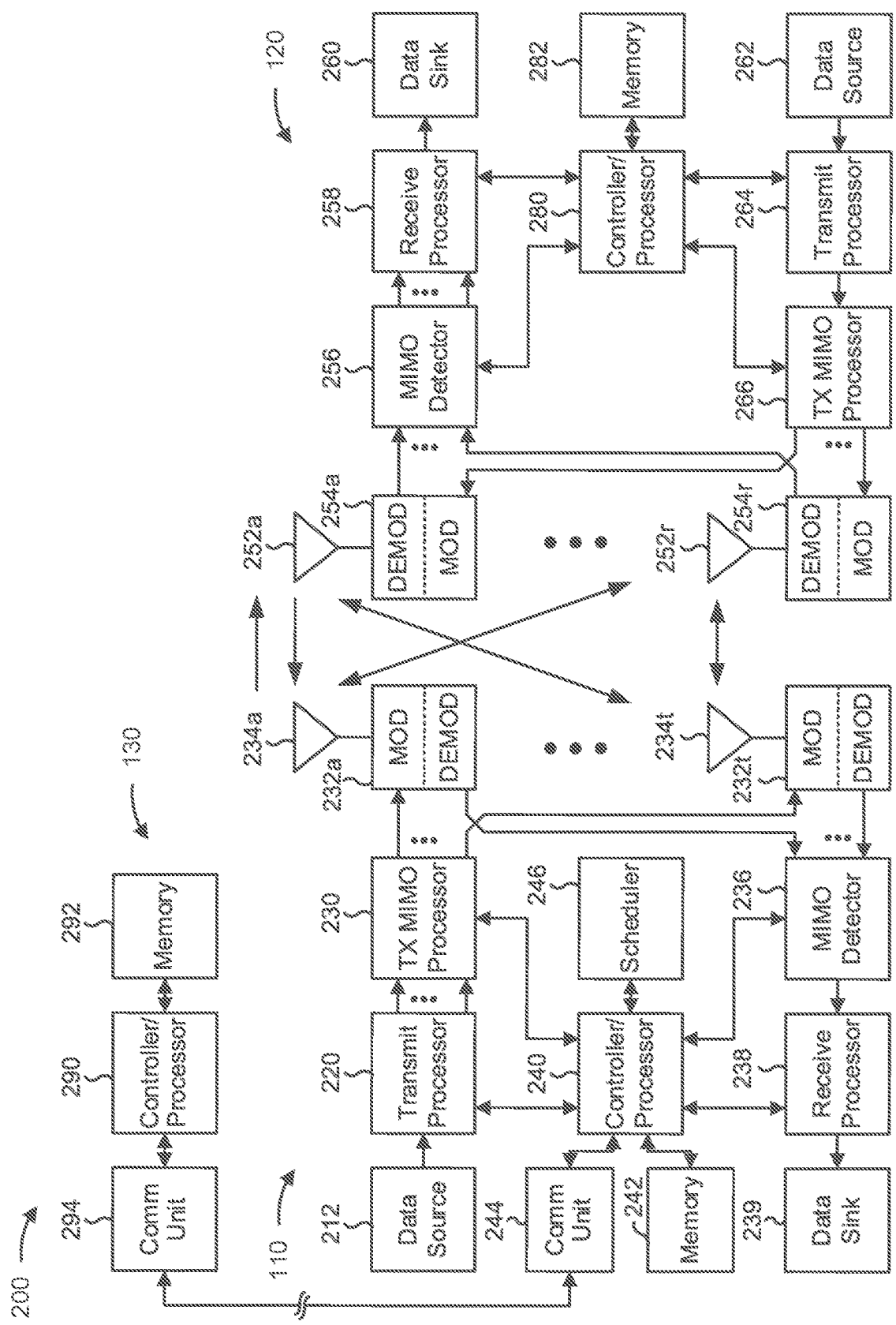
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Transmit processor 220 also may process system information (for example, for semi-static resource partitioning information (SRPI)) and control information (for example, CQI requests, grants, and upper layer signaling) and provide overhead symbols and control symbols. Transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), or other measurements. In some aspects, one or more components of UE 120 may be included in a housing.

On the uplink, at UE 120, a transmit processor 264 may receive and process data from a data source 262 and control information (for example, for reports including RSRP, RSSI, RSRQ, or CQI) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM or CP-OFDM), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (controller/processor) 240. Base station 110 may include communication unit 244 and communicate to network controller 130 via communication unit 244. Network controller 130 may include communication unit 294, a controller or processor (controller/processor) 290, and memory 292.

In some implementations, controller/processor 240 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 280 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Controller/processor 240 of base station 110, controller/processor 280 of UE 120, or any other component(s) of FIG. 2 may perform one or more techniques associated with a RACH-less timing advance determination, as described in more detail elsewhere herein. For example, controller/processor 240 of base station 110, controller/processor 280 of UE 120, or any other component(s) (or combinations of components) of FIG. 2 may perform or direct operations of, for example, processes 800 through 1200 of FIGS. 8 through 12, respectively, or other processes as described herein. Memories 242 and 282 may store data and program codes for base station 110 and UE 120, respectively. A scheduler 246 may schedule UEs for data transmission on the downlink, the uplink, or a combination thereof.

Figure 8:
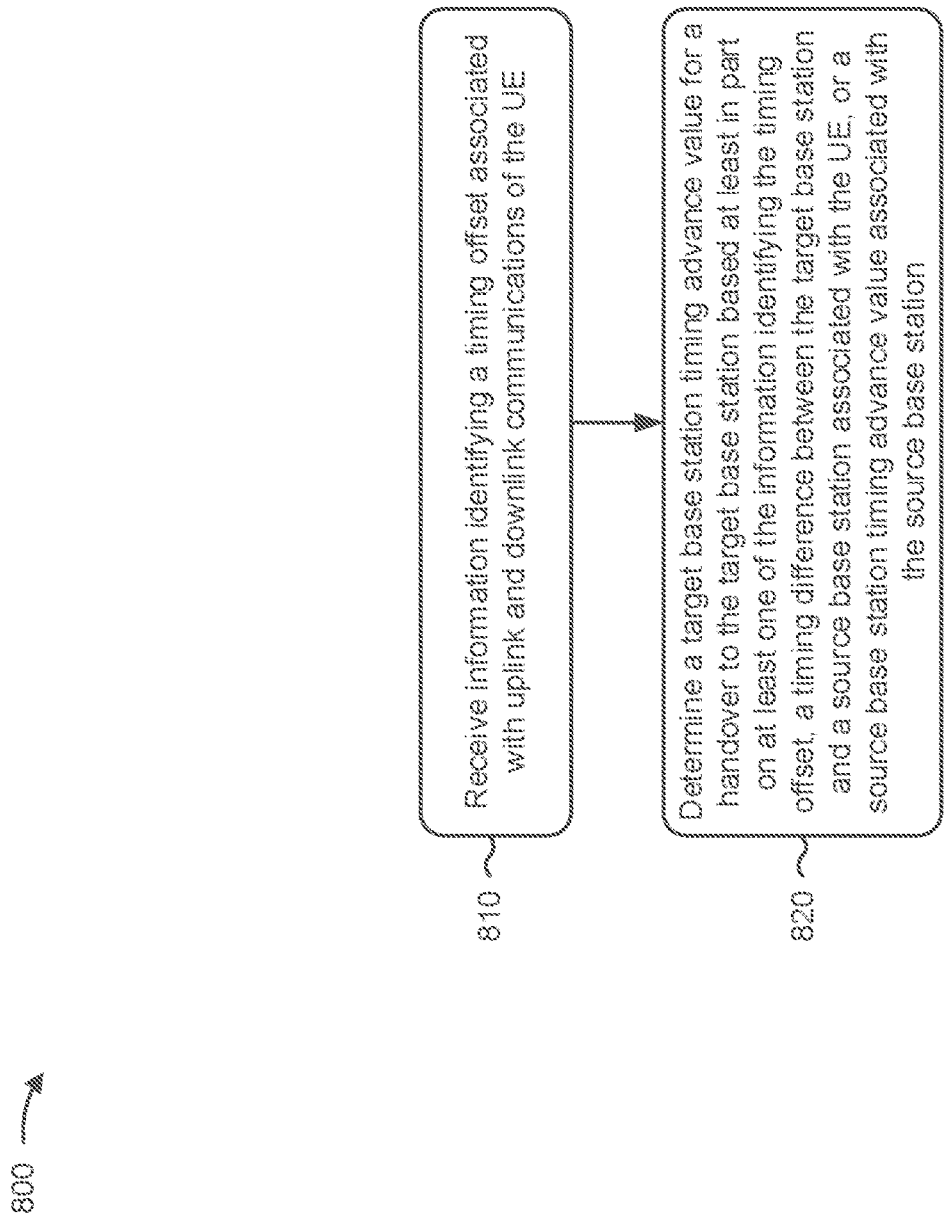
FIG. 8 is a diagram illustrating an example process performed, for example, by a user equipment.
Figure 9:
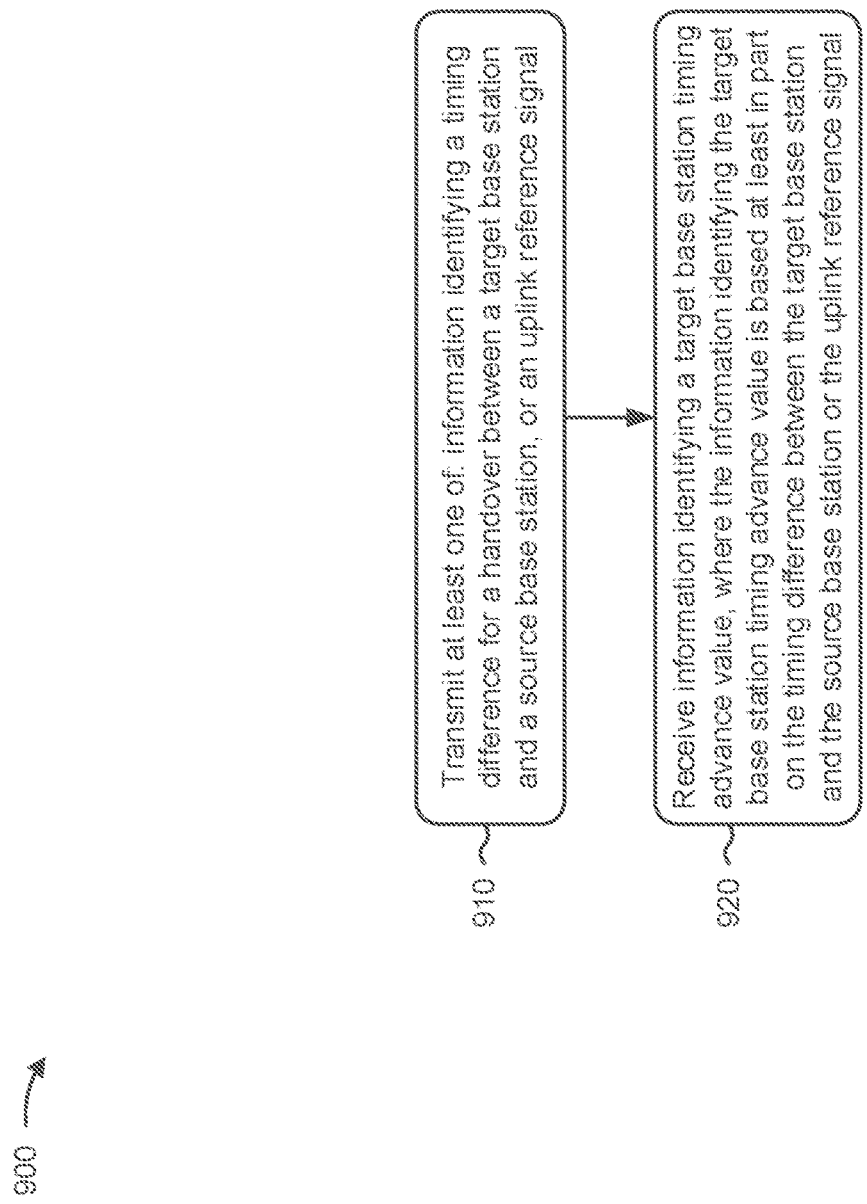
FIG. 9 is a diagram illustrating an example process performed, for example, by a user equipment.

The stored program codes, when executed by controller/processor 280 or other processors and modules at UE 120, may cause the UE 120 to perform operations described with respect to process 800 of FIG. 8, process 900 of FIG. 9, or other processes as described herein. The stored program codes, when executed by controller/processor 240 or other processors and modules at base station 110, may cause the base station 110 to perform operations described with respect to process 1000 of FIG. 10, process 1100 of FIG. 11, process 1200 of FIG. 12, or other processes as described herein. A scheduler 246 may schedule UEs for data transmission on the downlink, the uplink, or a combination thereof.

In some aspects, UE 120 may include means for receiving information identifying a timing offset associated with UL and DL communications of the UE; means for determining a target base station timing advance value for a handover to a target base station based at least in part on at least one of the information identifying the timing offset, a timing difference between the target base station and a source base station associated with the UE, or a source base station timing advance value associated with the source base station; means for determining the timing difference between the target base station and a source base station based at least in part on reference signaling received from the source base station and the target base station; means for transmitting at least one of: information identifying a timing difference between a target base station and a source base station associated with a handover, or an uplink reference signal; means for receiving information identifying a target base station timing advance value, where the information identifying the target base station timing advance value is based at least in part on the timing difference between the target base station and the source base station or the uplink reference signal; or combinations thereof. In some aspects, such means may include one or more components of UE 120 described in connection with FIG. 2, such as an apparatus of UE 120.

In some aspects, base station 110 may include means for receiving, from a UE, at least one of: information identifying a timing difference between the target base station and a source base station, where the target base station and the source base station are associated with a handover of a UE, or an uplink reference signal; means for providing, to the UE, information identifying a target base station timing advance value, where the target base station timing advance value is based at least in part on the information identifying the timing difference or the uplink reference signal; means for determining the target base station timing advance value based at least in part on the information identifying the timing difference between the apparatus of the target base station and the source base station or the uplink reference signal; means for selecting a technique for determining the target base station timing advance value based at least in part on the information identifying the timing difference between the apparatus of the target base station and the source base station or the uplink reference signal; means for determining the target base station timing advance value as zero; means for determining the target base station timing advance value in accordance with a source base station timing advance value associated with the source base station; means for determining the target base station timing advance value using the uplink reference signal; means for providing, to the source base station to be transmitted to the UE, the information identifying the target base station timing advance value; means for determining a timing offset of a user equipment (UE), wherein the timing offset is based at least in part on a difference between a downlink propagation delay and an uplink propagation delay of the UE; means for transmitting, to the UE in connection with a handover of the UE from the apparatus of the source base station to a target base station, information identifying the timing offset t; means for receiving, from a user equipment (UE), information identifying a timing difference between the apparatus of the source base station and a target base station, wherein the timing difference between the apparatus of the source base station and the target base station is associated with a handover of the UE; means for transmitting information identifying a target base station timing advance value based at least in part on the information identifying the timing difference between the apparatus of the source base station and the target base station; means for determining the target base station timing advance value based at least in part on the information identifying the timing difference between the apparatus of the source base station and the target base station; means for selecting a technique for determining the target base station timing advance value based at least in part on the information identifying the timing difference between the apparatus of the source base station and the target base station; or combinations thereof. In some aspects, such means may include one or more components of base station 110 described in connection with FIG. 2, such as an apparatus of base station 110.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
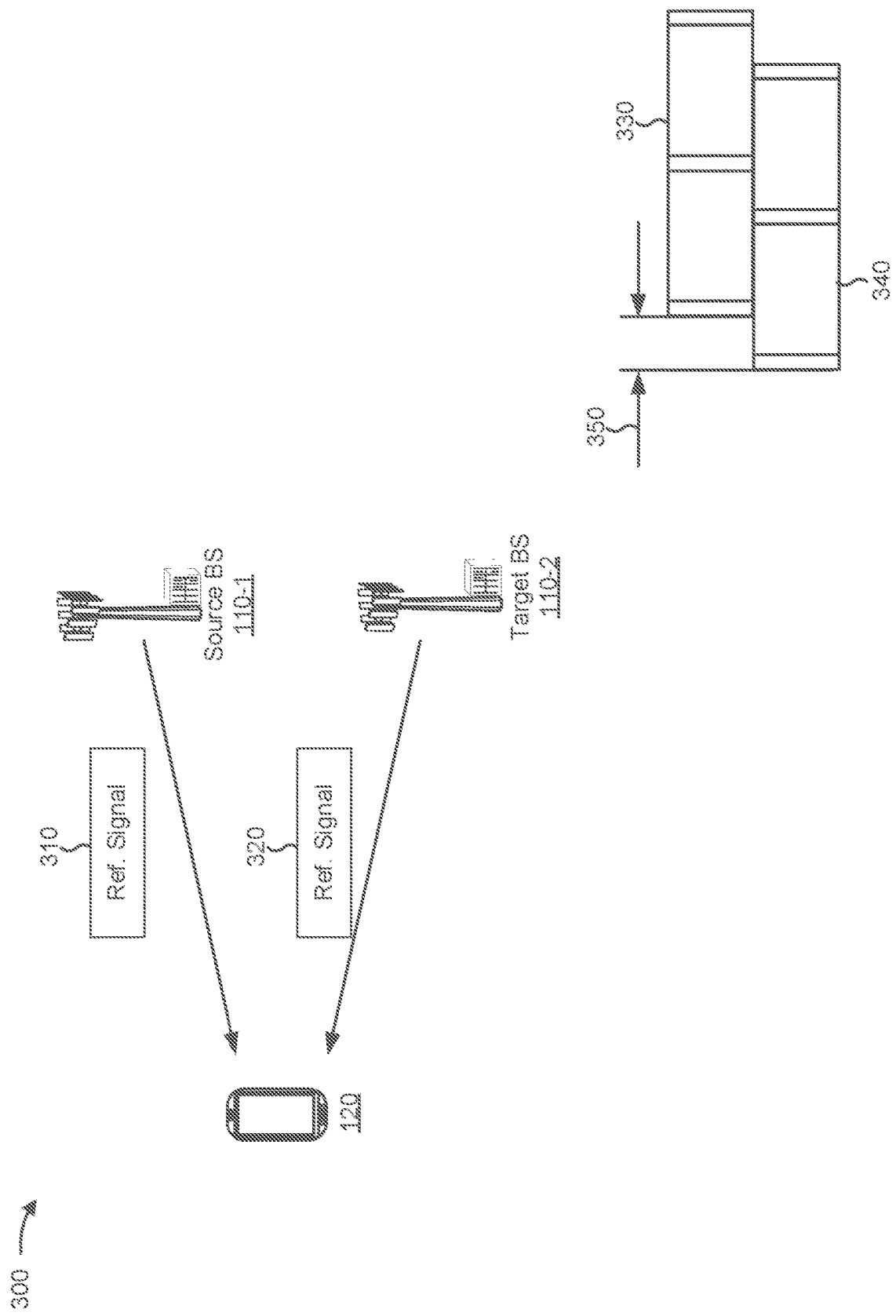
FIG. 3 is a diagram illustrating an example of timing advance for a source base station and a target base station.

FIG. 3 is a diagram illustrating an example 300 of timing advance for a source base station and a target base station. As shown in FIG. 3, and by reference numbers 310 and 320, a source BS 110-1 and a target BS 110-2 may provide respective reference signals to a UE 120. For example, the respective reference signals may include a demodulation reference signal, a phase tracking reference signal, a channel state information reference signal, or another reference signal. The UE 120 may use the respective reference signals to identify a timing difference between the source BS 110-1 and the target BS 110-2.

Respective subframe timings of source BS 110-1 and target BS 110-2 are shown by reference numbers 330 and 340. These subframe timings are provided as examples, and the techniques and apparatuses described herein may be used to identify a timing difference based at least in part on any set of subframe timings (such as different than the subframe timing shown).

The UE 120 may determine a timing difference 350 between the source BS 110-1 and the target BS 110-2 based at least in part on the respective reference signals. For example, the UE 120 may determine a reference signal timing difference (RSTD) value between the source BS 110-1 and the target BS 110-2 by identifying start times of subframes of the source BS 110-1 and the target BS 110-2 based at least in part on the respective reference signals. In some aspects, the UE 120 may determine the timing difference 350 as a difference between respective start times of subframes of the source BS 110-1 and the target BS 110-2. For example, RSTD may be defined as $T_{target} - T_{Source}$, where $T_{target}$ is a time at which the UE 120 receives a start of a particular subframe from the target BS 110-2 and $T_{source}$ is a time at which the UE 120 receives a start of a subframe that is closest in time to the particular subframe from the source BS 110-1. At least one of the UE 120, the source BS 110-1, or the target BS 110-2 may use the timing difference 350 to determine a timing offset between the UE 120 and the target BS 110-2, as described in more detail elsewhere herein.

Figure 4:
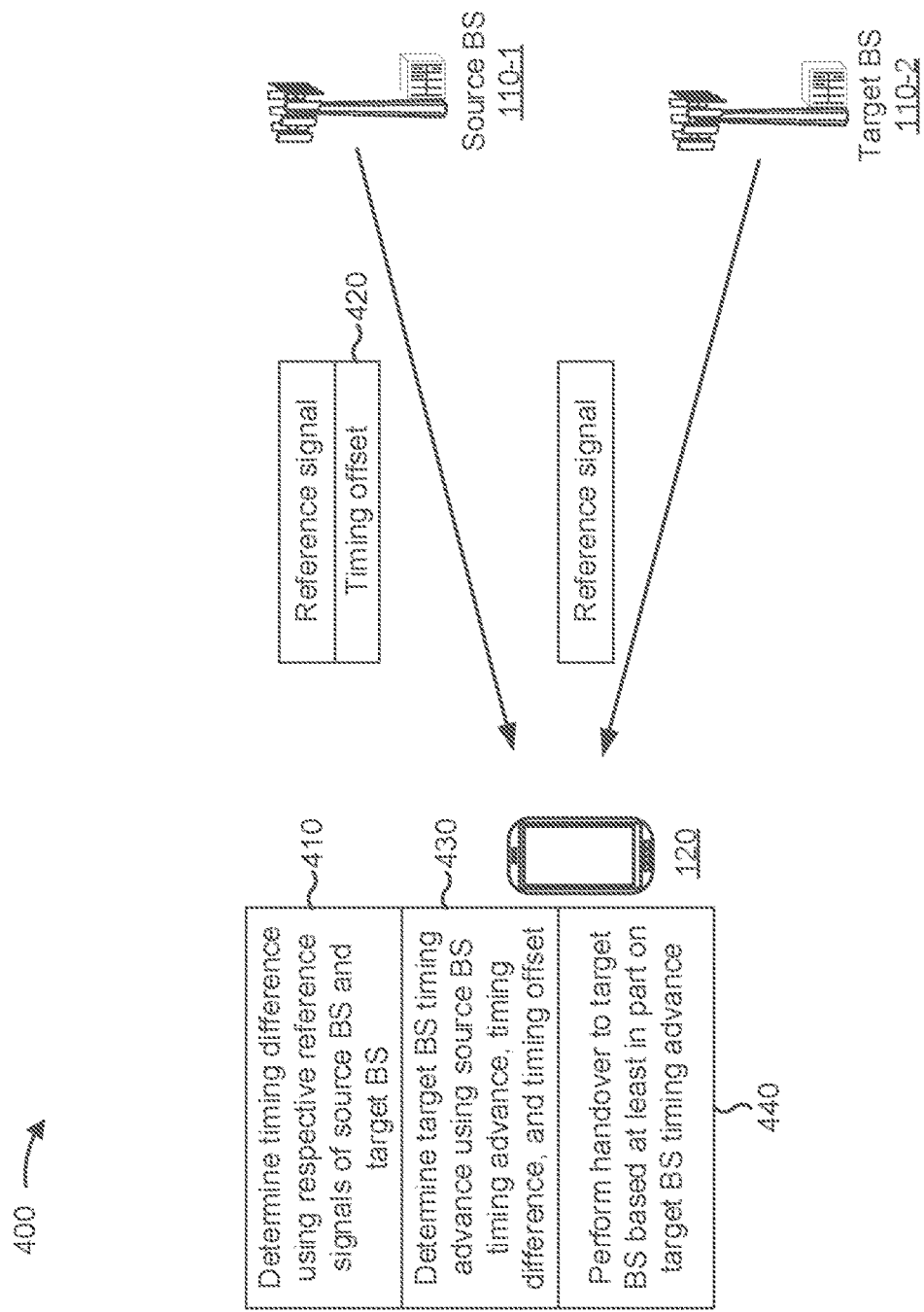
FIG. 4 is a diagram illustrating an example of random access channel (RACH)-less timing advance determination.

FIG. 4 is a diagram illustrating an example 400 of random access channel (RACH)-less timing advance determination. As shown, the example 400 includes a UE 120, a source BS 110-1, and a target BS 110-2. As shown in FIG. 4, and as described in more detail in connection with FIG. 3, source BS 110-1 and target BS 110-2 may provide respective reference signals to the UE 120. As shown by reference number 410, and as described in more detail in connection with FIG. 3, the UE 120 may determine a timing difference (such as timing difference 350 or RSTD) between the source BS 110-1 and the target BS 110-2 using the respective reference signals of the source BS 110-1 and the target BS 110-2.

As shown by reference number 420, the UE 120 may receive information identifying a timing offset from source BS 110-1. The timing offset may identify a difference between an uplink timing and a downlink timing of the UE 120. For example, the timing offset may identify a timing mis-alignment between the uplink and the downlink due to a difference in propagation delay (since the uplink and the downlink are likely to propagate via different paths), a switching time from transmitting to receiving or vice versa, a hardware constraint of the UE 120 or a BS 110, a propagation delay between transmit and reception, or a similar cause of timing mis-alignment. The timing offset may be represented herein using the variable $\Delta\tau$. In some aspects, the source BS 110-1 may provide the information identifying the timing offset in a handover command, such as a radio resource control (RRC) connection reconfiguration message.

In some aspects, a granularity of the timing offset may be based at least in part on a numerology of the target BS 110-2, such as a numerology of a physical uplink shared channel (PUSCH) for the target BS 110-2 or a numerology of an uplink bandwidth part of the target BS 110-2. For example, the timing offset may use a more granular or more precise value for a numerology associated with a shorter slot length than for a numerology associated with a longer slot length. Thus, the source BS 110-1 may conserve signalling resources that would otherwise be used to signal an unnecessarily precise timing offset.

As shown by reference number 430, the UE 120 may determine a target base station timing advance value associated with the target BS 110-2 using the timing offset, the timing difference, and a source base station timing advance value associated with the source BS 110-1. For example, the UE 120 may determine the timing advance value for the source BS 110-1 based at least in part on communicating with the source BS 110-1 or based at least in part on receiving information identifying the timing advance value for the source BS 110-1. The timing advance value for the source BS 110-1 may be represented as $TA_{source}$. In some aspects, the UE 120 may determine the timing advance value for the source BS 110-1, $TA_{target}$, as $TA_{target} = TA_{source} + RSTD + \Delta\tau$.

As shown by reference number 440, the UE 120 may perform the handover to the target BS 110-2 based at least in part on the target BS 110-2's timing advance. For example, the UE 120 may perform the handover without performing a RACH procedure with regard to the target BS 110-2. In this way, the UE 120 may determine the timing advance value for the target BS 110-2 based at least in part on the timing advance value for the source BS 110-1, the timing difference between the source BS 110-1 and the target BS 110-2, and the timing offset of the UE 120. Thus, the UE 120 may determine the timing advance value for the target BS 110-2 without receiving explicit signalling identifying the timing advance value for the target BS 110-2 and without performing a RACH procedure as part of the handover, thereby reducing latency and user interruption associated with the handover.

Figure 5:
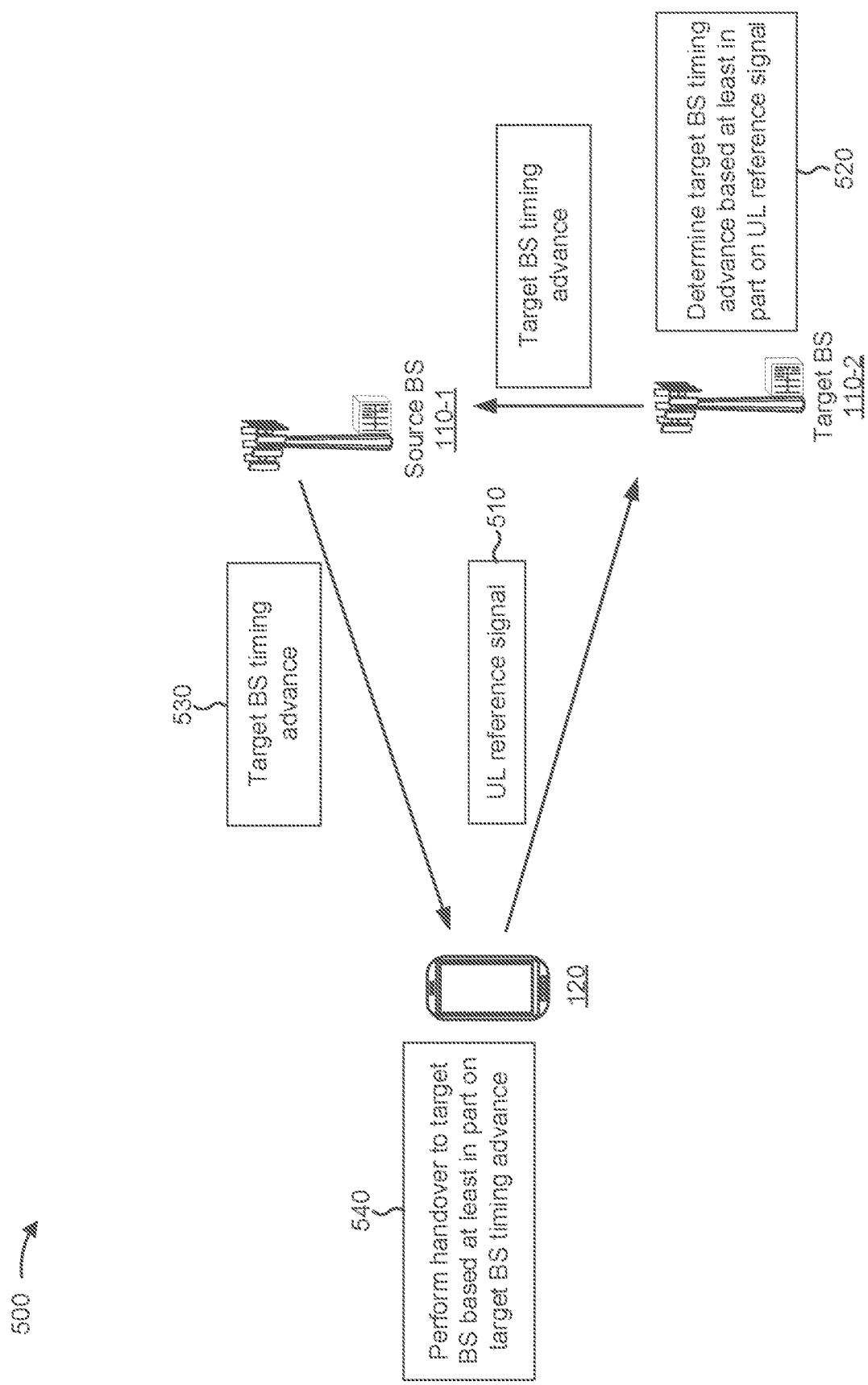
FIG. 5 is a diagram illustrating another example of RACH-less timing advance determination.

FIG. 5 is a diagram illustrating another example 500 of RACH-less timing advance determination. The example 500 is where the target BS 110-2 determines the target BS timing advance based at least in part on an uplink reference signal of the UE 120.

As shown in FIG. 5, and by reference number 510, the UE 120 may provide an uplink (UL) reference signal to the target BS 110-2. For example, the uplink reference signal may include a sounding reference signal (SRS) (such as an SRS associated with a multiple-input multiple-output (MIMO) operation), a reference signal for a positioning purpose, or another reference signal.

As shown by reference number 520, the target BS 110-2 may determine the target BS timing advance based at least in part on the uplink reference signal. For example, the target BS 110-2 may determine a time at which the uplink reference signal was transmitted, and may determine a difference between the time at which the uplink reference signal was transmitted and a time at which the target BS 110-2 receives the uplink reference signal. Thus, the target BS 110-2 may determine the target BS timing advance without knowledge of the source BS timing advance and without performing a RACH procedure with the UE 120, thereby reducing latency of handover.

As shown by reference number 530, the source BS 110-1 may provide information identifying the target BS timing advance to the UE 120. For example, the target BS 110-2 may provide information identifying the target BS timing advance to the source BS 110-1, and the source BS 110-1 may provide this information to the UE 120. In some aspects, the information identifying the target BS timing advance may be provided in a handover command. In some aspects, the target BS 110-2 may provide the information identifying the target BS timing advance to the source BS 110-1. As shown by reference number 540, the UE 120 may perform the handover to the target BS based at least in part on the target BS timing advance.

Figure 6:
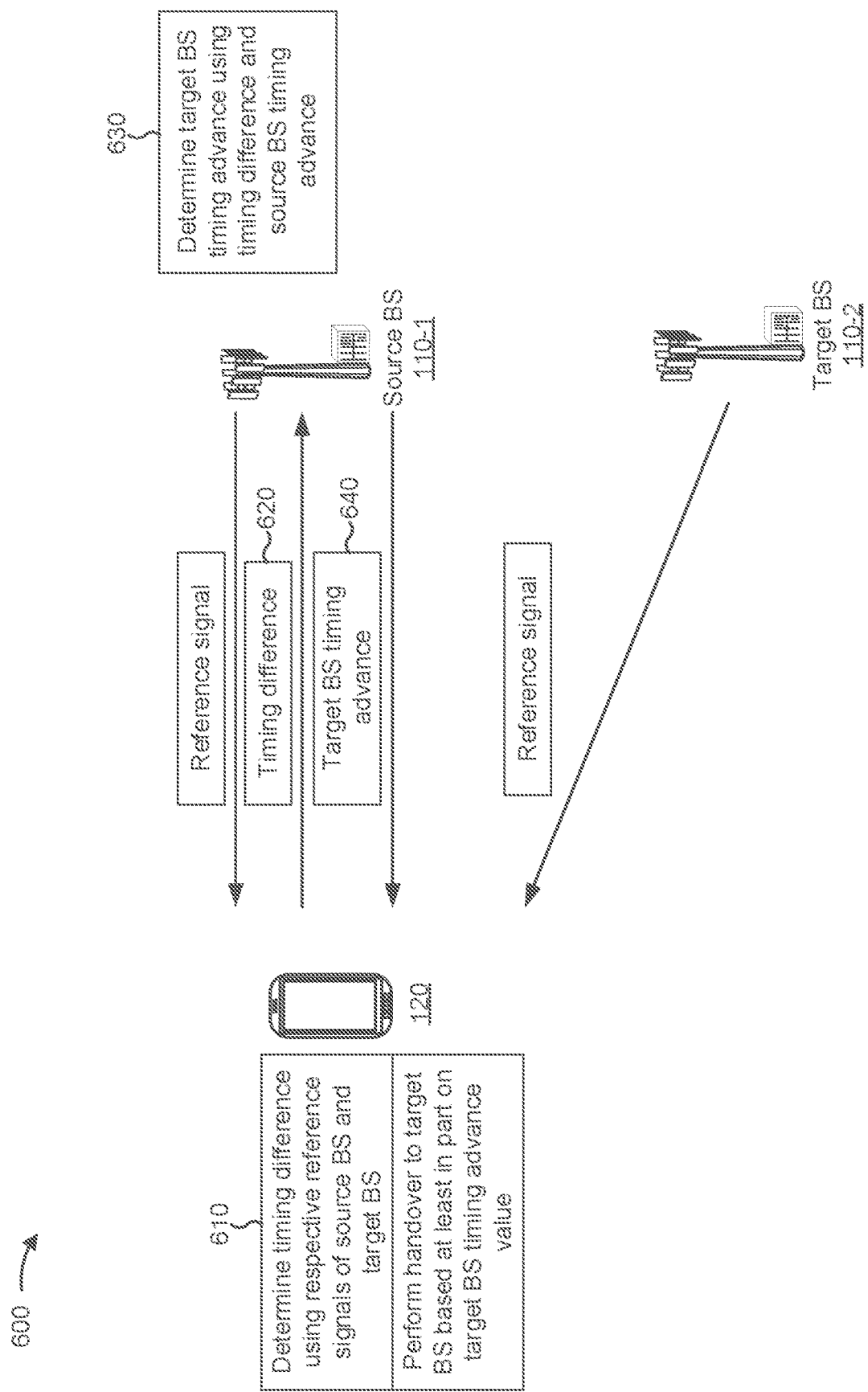
FIG. 6 is a diagram illustrating yet another example of RACH-less timing advance determination.

FIG. 6 is a diagram illustrating yet another example 600 of RACH-less timing advance determination. In the example 600, the source BS 110-1 determines the target BS timing advance. As shown in FIG. 6, and by reference number 610, the UE 120 may determine a timing difference between the source BS 110-1 and the target BS 110-2 using the respective reference signals of the source BS 110-1 and the target BS 110-2. As shown by reference number 620, the UE 120 may provide information identifying the timing difference to, for example, the source BS 110-1. In some aspects, the UE 120 may provide a quantization of the timing difference. For example, the UE 120 may provide a b-bit quantization or a different type of quantization of the timing difference, thereby conserving signaling resources that would otherwise be used to provide information identifying the timing difference at a sample-time granularity or another, more complex granularity than the quantization. In some aspects, the UE 120 may provide the information identifying the timing difference in a radio resource management (RRM) report.

As shown by reference number 630, the source BS 110-1 may determine the target BS timing advance using the timing difference and a source BS timing advance for the UE 120. In some aspects, the source BS 110-1 may determine the target BS timing advance based at least in part on a timing offset ($\Delta\tau$), which may improve the accuracy of the target BS timing advance relative to a case where the source BS 110-1 does not take into account the timing offset. In such a case, the source BS 110-1 may determine the target BS timing advance as $TA_{target}=TA_{source}$ RSTD+$\Delta\tau$. In some aspects, the source BS 110-1 may determine the target BS timing advance without using the timing offset, which may simplify determination of the target BS timing advance.

As shown by reference number 640, the source BS 110-1 may provide information identifying the target BS timing advance to the UE 120. For example, the source BS 110-1 may provide the information identifying the target BS timing advance in a handover command, as described in more detail elsewhere herein. As further shown, the UE 120 may perform the handover to the target BS 110-2 based at least in part on the target BS timing advance value, thereby reducing latency of the handover relative to a handover that uses a RACH procedure to determine the target BS timing advance value.

Figure 7:
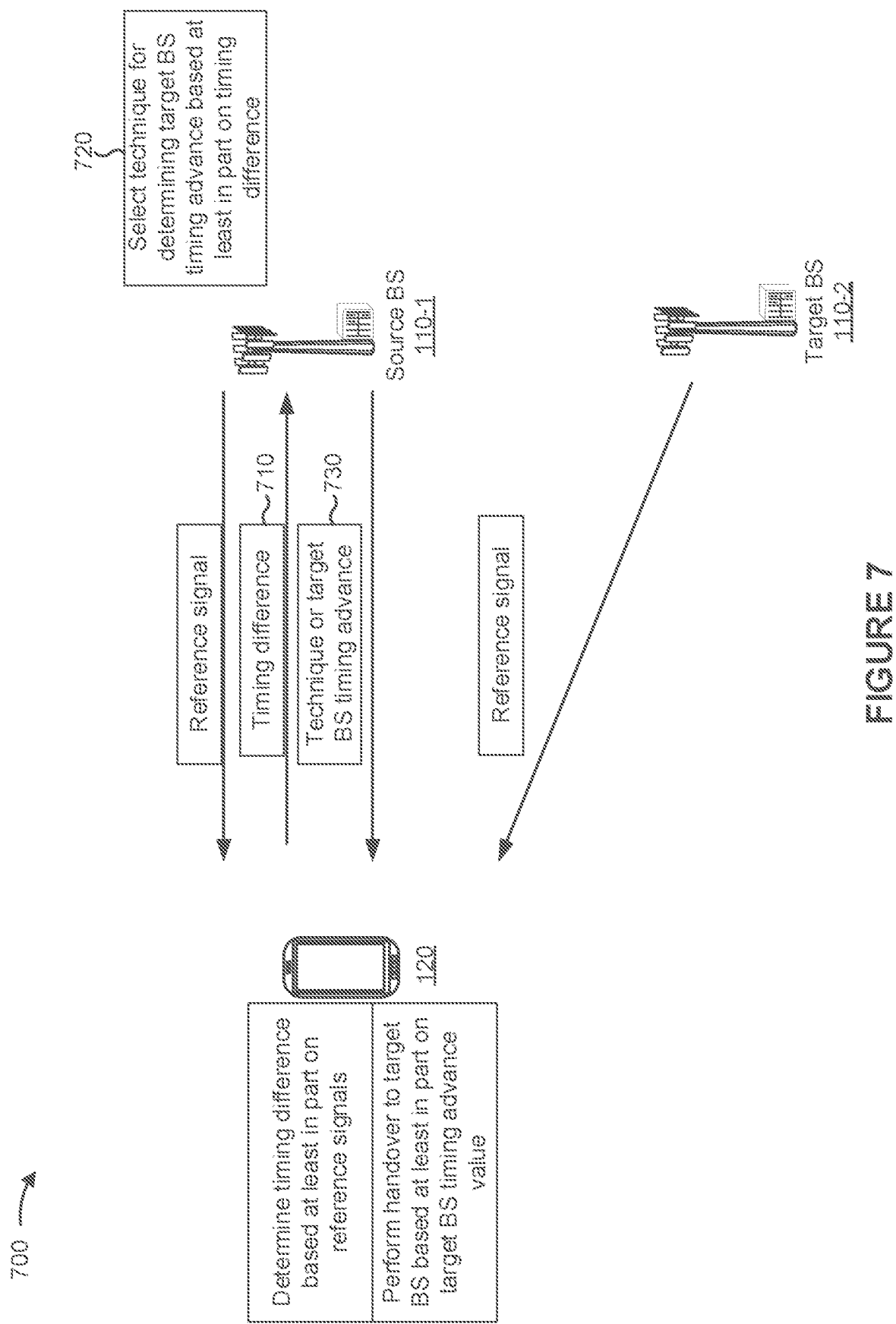
FIG. 7 is a diagram illustrating still another example of RACH-less timing advance determination.

FIG. 7 is a diagram illustrating still another example 700 of RACH-less timing advance determination. In the example 700, a BS 110 selects a technique for determining the target BS timing advance based at least in part on a timing difference between the source BS 110-1 and the target BS 110-2. In some aspects, at least some of the operations described in example 700 may be performed by the source BS 110-1 (as shown in FIG. 7). In some aspects, at least some of the operations described in example 700 may be performed by the target BS 110-2 (not shown in FIG. 7).

As shown in FIG. 7, and by reference number 710, the UE 120 may provide information identifying a timing difference to the source BS 110-1. For example, and as shown, the UE 120 may determine the timing difference based at least in part on reference signals of the source BS 110-1 and the target BS 110-2. In some aspects, the UE 120 may provide a quantization of the timing difference to the source BS 110-1. In some aspects, the UE 120 may provide the information identifying the timing difference to the target BS 110-2.

As shown by reference number 720, the source BS 110-1 (or the target BS 110-2) may select a technique for determining the target BS timing advance based at least in part on the timing difference. For example, the technique may include determining the target BS timing advance as zero, determining the target BS timing advance in accordance with a source base station timing advance value for the source BS 110-1, or determining the target BS timing advance using an uplink reference signal (as described in more detail in connection with example 400). In some aspects, the source BS 110-1 may select the technique based at least in part on the timing difference. For example, the source BS 110-1 may determine whether the timing difference is in a first range of zero to X1, a second range of X1 to X2, or a third range of greater than X2. When the timing difference is in the first range, the source BS 110-1 may determine that the target BS timing advance is to be determined in accordance with the timing advance value for the source BS 110-1. When the timing difference is in the second range, the source BS 110-1 may determine that the target BS timing advance is to be determined as zero. When the timing difference is in the third range, the source BS 110-1 may determine that the target BS timing advance is to be determined using an uplink reference signal.

As shown by reference number 730, the source BS 110-1 (or the target BS 110-2) may provide information identifying the target BS timing advance or the technique to be used to determine the target BS timing advance. Accordingly, the UE 120 may determine the target BS timing advance as zero, or may determine the target BS timing advance as equal to the source BS timing advance. Additionally, or alternatively, the UE 120 may transmit an uplink reference signal to be used by the target BS 110-2 to determine the target BS timing advance. Thus, a BS 110 (such as the source BS 110-1 or the target BS 110-2) may determine the technique to be used based at least in part on the timing difference between the source BS 110-1 and the target BS 110-2, thereby improving flexibility of timing advance determination and conserving resources that might be used to perform an uplink reference signal-based timing advance determination.

FIG. 8 is a diagram illustrating an example process 800 performed, for example, by a UE. The process 800 shows an example where a UE (for example, UE 120) performs a RACH-less timing advance determination. In some aspects, the process 800 may be performed by an apparatus of a UE, which may include one or more interfaces and a processing system, as described elsewhere herein.

As shown in FIG. 8, in some aspects, the process 800 may include receiving information identifying a timing offset associated with uplink and downlink communications of the UE (block 810). For example, the UE (such as using antenna 252, DEMOD 254, MIMO detector 256, receive processor 258, or controller/processor 280) may receive information identifying a timing offset associated with uplink and downlink communications of the UE. In some aspects, the timing offset may be referred to herein as Δτ.

As shown in FIG. 8, in some aspects, the process 800 may include determining a target base station timing advance value for a handover to the target base station based at least in part on at least one of the information identifying the timing offset, a timing difference between the target base station and a source base station associated with the UE, or a source base station timing advance value associated with the source base station (block 820). For example, the UE (such as using controller/processor 280) may determine a target base station timing advance associated with a handover to a target base station. The UE may determine the timing advance based at least in part on at least one of the information identifying the timing offset, a timing difference between the target base station and a source base station associated with the UE, or a source base station timing advance value associated with the source base station.

The process 800 may include additional aspects, such as any single aspect or any combination of aspects described below or in connection with one or more other processes described elsewhere herein.

In a first aspect, the timing difference is based at least in part on a reference signal timing difference between the target base station and the source base station. In a second aspect, alone or in combination with the first aspect, the UE may determine the timing difference between the target base station and the source base station based at least in part on reference signaling received from the source base station and the target base station.

In a third aspect, alone or in combination with one or more of the first and second aspects, the timing offset is based at least in part on a switching time (e.g., a transmit-to-receive switching time and/or the like), a propagation delay between transmit and reception, or a hardware configuration of at least one of the UE, the source base station, or the target base station. In a fourth aspect, alone or in combination with one or more of the first through third aspects, a granularity of the timing offset is based at least in part on at least one of a numerology, or a slot length of the target base station. In a fifth aspect, alone or in combination with one or more of the first through fourth aspects, the information identifying the timing offset is received in a handover command. In a sixth aspect, alone or in combination with one or more of the first through fifth aspects, the target base station timing advance value is determined without performing a random access procedure (a RACH procedure). In a seventh aspect, alone or in combination with one or more of the first through sixth aspects, the target base station timing advance value is determined based at least in part on the information identifying the timing offset, the timing difference between the target base station and the source base station, and the source base station timing advance value.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

FIG. 9 is a diagram illustrating an example process 900 performed, for example, by a UE. The process 900 shows an example where a UE (for example, UE 120) performs a RACH-less timing advance determination. In some aspects, the process 900 may be performed by an apparatus of a UE, which may include one or more interfaces and a processing system, as described elsewhere herein.

As shown in FIG. 9, in some aspects, the process 900 may include transmitting at least one of: information identifying a timing difference for a handover between a target base station and a source base station, or an uplink reference signal (block 910). For example, the UE (such as using controller/processor 280, transmit processor 264, TX MIMO processor 266, MOD 254, or antenna 252) may transmit information identifying a timing difference for a handover between a target base station and a source base station (e.g., from the source base station to the target base station). In some aspects, the UE may transmit an uplink reference signal.

As shown in FIG. 9, in some aspects, the process 900 may include receiving information identifying a target base station timing advance value, where the information identifying the target base station timing advance value is based at least in part on the timing difference between the target base station and the source base station or the uplink reference signal (block 920). For example, the UE (such as using antenna 252, DEMOD 254, MIMO detector 256, receive processor 258, or controller/processor 280) may receive information identifying a target base station timing advance value. The information identifying the target base station timing advance value may be based at least in part on the timing difference between the target base station and the source base station or the uplink reference signal.

The process 900 may include additional aspects, such as any single aspect or any combination of aspects described below or in connection with one or more other processes described elsewhere herein.

In a first aspect, the handover is performed without performing a random access procedure. In a second aspect, alone or in combination with the first aspect, the information identifying the timing difference between the target base station and the source base station is a quantization of the timing difference between the target base station and the source base station. In a third aspect, alone or in combination with the first and second aspects, the information identifying the timing difference between the target base station and the source base station is provided in a radio resource management report. In a fourth aspect, alone or in combination with one or more of the first through third aspects, the uplink reference signal includes a sounding reference signal.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

Figure 10:
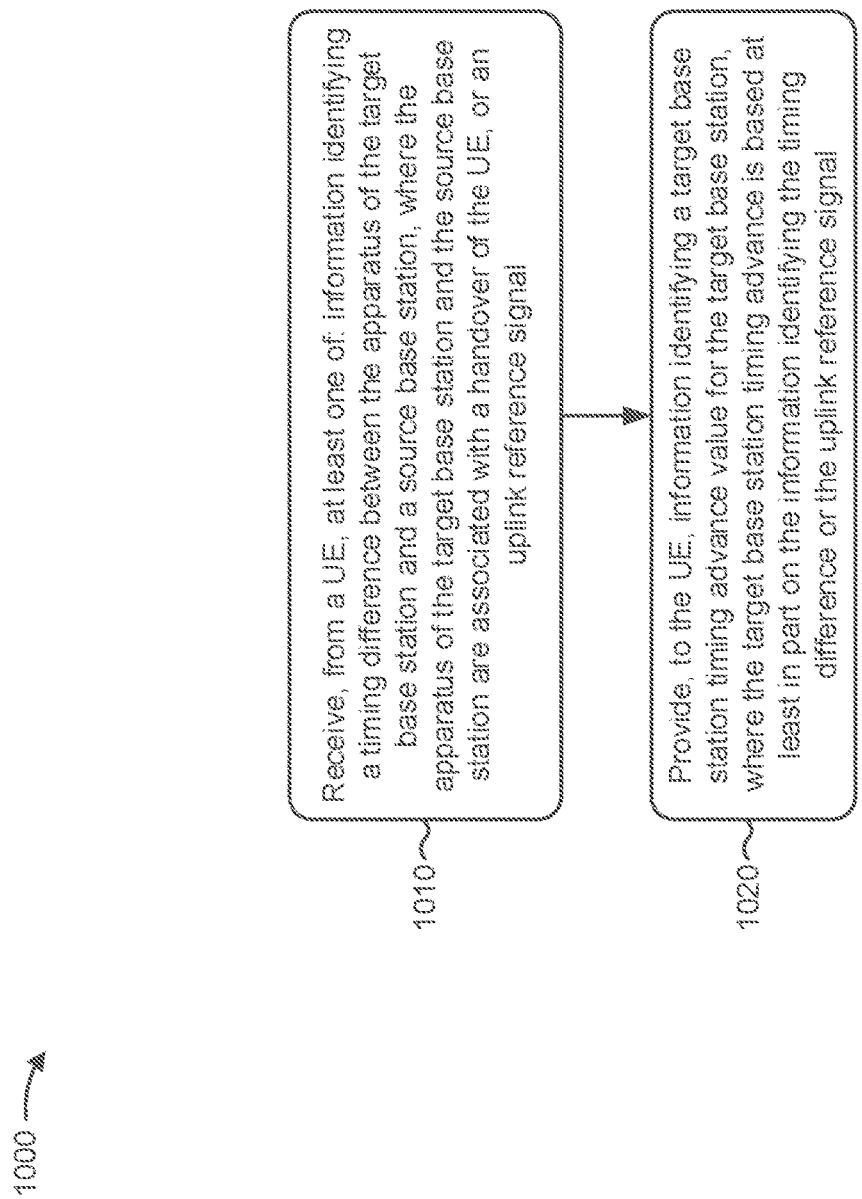
FIG. 10 is a diagram illustrating an example process performed, for example, by a target base station.

FIG. 10 is a diagram illustrating an example process 1000 performed, for example, by a target base station. The process 1000 is an example where a target base station (for example, BS 110) performs a RACH-less timing advance base station. In some aspects, the process 1000 may be performed by an apparatus of a UE, which may include one or more interfaces and a processing system, as described elsewhere herein.

As shown in FIG. 10, in some aspects, the process 1000 may include receiving, from a UE, at least one of: information identifying a timing difference between the apparatus of the target base station and a source base station, where the apparatus of the target base station and the source base station are associated with a handover of the UE, or an uplink reference signal (block 1010). For example, the target base station (such as using antenna 234, DEMOD 232, MIMO detector 236, receive processor 238, or controller/processor 240) may receive, from a UE (such as UE 120)

information identifying a timing difference between the apparatus of the target base station and a source base station, or an uplink reference signal. The apparatus of the target base station and the source base station may be associated with a handover of the UE (e.g., from the source base station to the target base station).

As shown in FIG. 10, in some aspects, the process 1000 may include providing, to the UE, information identifying a target base station timing advance value for the target base station, where the target base station timing advance is based at least in part on the information identifying the timing difference or the uplink reference signal (block 1020). For example, the target base station (such as using controller/processor 240, transmit processor 220, TX MIMO processor 230, MOD 232, or antenna 234) may provide, to the UE, information identifying a target base station timing advance value. The target base station timing advance value may be based at least in part on information identifying the timing difference between the target base station and the source base station or the uplink reference signal.

The process 1000 may include additional aspects, such as any single aspect or any combination of aspects described below or in connection with one or more other processes described elsewhere herein.

In a first aspect, the information identifying the timing difference between the apparatus of the target base station and the source base station is a quantization of the timing difference between the apparatus of the target base station and the source base station. In a second aspect, alone or in combination with the first aspect, the information identifying the timing difference between the apparatus of the target base station and the source base station is received in a radio resource management report. In a third aspect, alone or in combination with one or more of the first and second aspects, the uplink reference signal includes a sounding reference signal. In a fourth aspect, alone or in combination with one or more of the first through third aspects, the target base station may determine the target base station timing advance value based at least in part on the information identifying the timing difference between the apparatus of the target base station and the source base station or the uplink reference signal. In a fifth aspect, alone or in combination with one or more of the first through fourth aspects, the target base station may select a technique for determining the target base station timing advance value based at least in part on the information identifying the timing difference between the apparatus of the target base station and the source base station or the uplink reference signal. In a sixth aspect, alone or in combination with one or more of the first through fifth aspects, the technique is selected from a plurality of techniques including at least one of determining the target base station timing advance value as zero, determining the target base station timing advance value in accordance with a source base station timing advance value associated with the source base station, or determining the target base station timing advance value using the uplink reference signal. In a seventh aspect, alone or in combination with one or more of the first through sixth aspects, the target base station may provide, to the source base station to be transmitted to the UE, the information identifying the target base station timing advance value. In an eighth aspect, alone or in combination with one or more of the first through seventh aspects, the handover is performed without performing a random access procedure.

Although FIG. 10 shows example blocks of the process 1000, in some aspects, the process 1000 may include additional blocks, fewer blocks, different blocks, or differently arranged blocks than those depicted in FIG. 10. Additionally, or alternatively, two or more of the blocks of the process 1000 may be performed in parallel.

Figure 11:
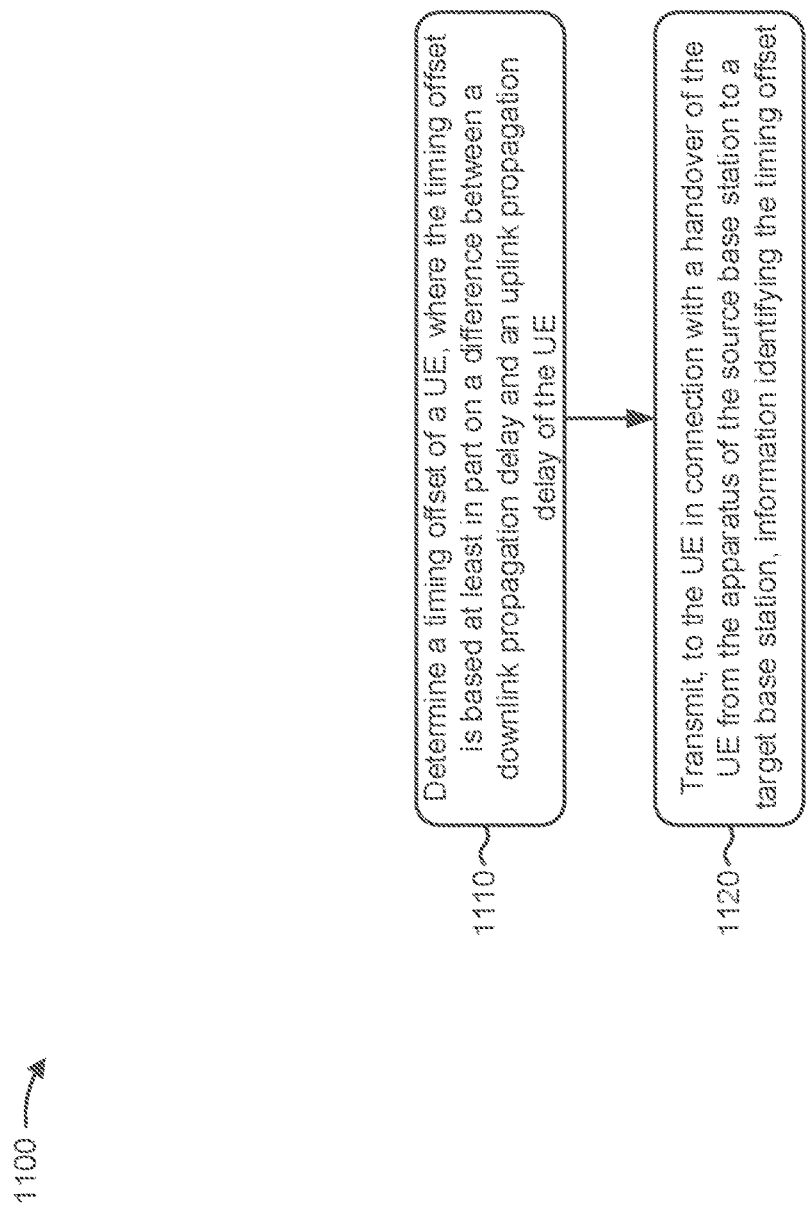
FIG. 11 is a diagram illustrating an example process performed, for example, by a source base station.

FIG. 11 is a diagram illustrating an example process 1100 performed, for example, by a source base station. The process 1100 is an example where a source base station (for example, BS 110) performs a RACH-less timing advance determination. In some aspects, the process 1100 may be performed by an apparatus of a base station, which may include one or more interfaces and a processing system, as described elsewhere herein.

As shown in FIG. 11, in some aspects, the process 1100 may include determining a timing offset of a UE, where the timing offset is based at least in part on a difference between a downlink propagation delay and an uplink propagation delay of the UE (block 1110). For example, the source base station (such as using controller/processor 240) may determine a timing offset of a UE. The timing offset may be based at least in part on a difference between a downlink propagation delay and an uplink propagation delay of the UE.

As shown in FIG. 11, in some aspects, the process 1100 may include transmitting, to the UE in connection with a handover of the UE from the apparatus of the source base station to a target base station, information identifying the timing offset (block 1120). For example, the source base station (such as using controller/processor 240, transmit processor 220, TX MIMO processor 230, MOD 232, or antenna 234) may transmit, to the UE in connection with the handover of the UE from the source base station to a target base station, information identifying the timing offset.

The process 1100 may include additional aspects, such as any single aspect or any combination of aspects described below or in connection with one or more other processes described elsewhere herein.

In a first aspect, the timing offset is based at least in part on a switching time, a propagation delay between transmit and reception, or a hardware configuration of at least one of the UE, the source base station, or the target base station. In a second aspect, alone or in combination with the first aspect, the information identifying the timing offset is transmitted in connection with a handover command. In a third aspect, alone or in combination with one or more of the first and second aspects, a granularity of the timing offset is based at least in part on a numerology or a slot length of the target base station.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

Figure 12:
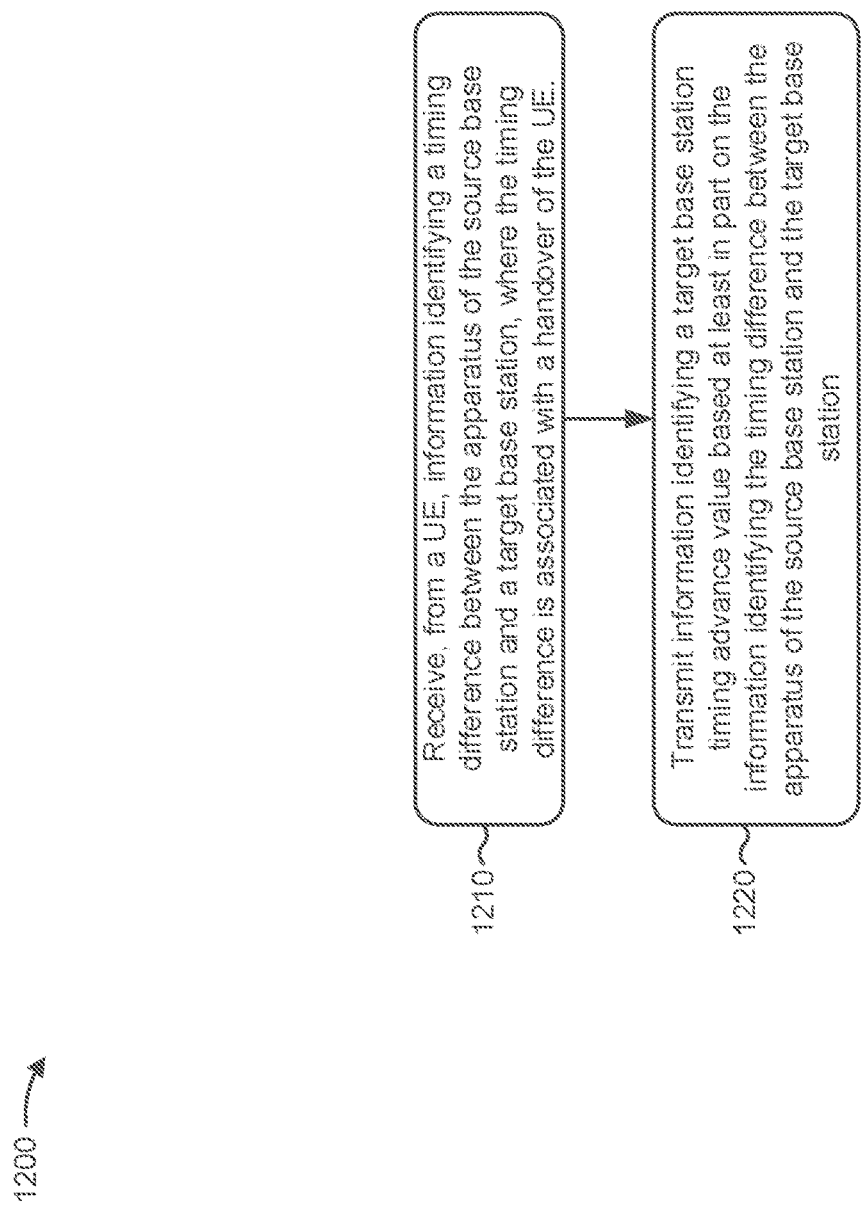
FIG. 12 is a diagram illustrating an example process performed, for example, by a source base station.

FIG. 12 is a diagram illustrating an example process 1200 performed, for example, by a source base station. The process 1200 is an example where a source base station (for example, BS 110) performs a RACH-less timing advance determination. In some aspects, the process 1200 may be performed by an apparatus of a base station, which may include one or more interfaces and a processing system, as described elsewhere herein.

As shown in FIG. 12, in some aspects, the process 1200 may include receiving, from a UE, information identifying a timing difference between the apparatus of the source base station and a target base station, where the timing difference is associated with a handover of the UE (block 1210). For example, the source base station (such as using antenna 234, DEMOD 232, MIMO detector 236, receive processor 238, or controller/processor 240) may receive, from a UE, information identifying a timing difference between the apparatus of the source base station and a target base station. The timing difference may be associated with a handover of the UE.

As shown in FIG. 12, in some aspects, the process 1200 may include transmitting information identifying a target base station timing advance value based at least in part on the information identifying the timing difference between the apparatus of the source base station and the target base station (block 1220). For example, the source base station (such as using controller/processor 240, transmit processor 220, TX MIMO processor 230, MOD 232, or antenna 234) may transmit information identifying a target base station timing advance value based at least in part on the information identifying the timing difference between the apparatus of the source base station and the target base station.

The process 1200 may include additional aspects, such as any single aspect or any combination of aspects described below or in connection with one or more other processes described elsewhere herein.

In a first aspect, the information identifying the timing difference between the apparatus of the source base station and the target base station is a quantization of the timing difference. In a second aspect, alone or in combination with the first aspect, the information identifying the timing difference between the apparatus of the source base station and the target base station is received in a radio resource management report. In a third aspect, alone or in combination with one or more of the first and second aspects, the information identifying the target base station timing advance value is transmitted in connection with a handover command. In a fourth aspect, alone or in combination with one or more of the first through third aspects, the source base station may determine the target base station timing advance value based at least in part on the information identifying the timing difference between the apparatus of the source base station and the target base station. In a fifth aspect, alone or in combination with one or more of the first through fourth aspects, the source base station may select a technique for determining the target base station timing advance value based at least in part on the information identifying the timing difference between the apparatus of the source base station and the target base station. In a sixth aspect, alone or in combination with one or more of the first through fifth aspects, the technique is selected from a plurality of techniques including at least one of determining the target base station timing advance value as zero, determining the target base station timing advance value in accordance with a source base station timing advance value associated with the apparatus of the source base station, or determining the target base station timing advance value using the uplink reference signal.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
    receiving, in a handover command form a source base station associated with the UE, information identifying a timing offset associated with uplink (UL) and downlink (DL) communications of the apparatus of the UE; and
    determining a target base station timing advance value for a handover to a target base station based on the information identifying the timing offset and at least one of:
        a timing difference between the target base station and the source base station, or
        a source base station timing advance value associated with the source base station.

2. The method of claim 1, further comprising:
    determining the timing difference between the target base station and the source base station based at least in part on reference signaling received from the source base station and the target base station.

3. The method of claim 1, wherein the timing offset is based at least in part on a switching time, a propagation delay between transmit and reception, or a hardware configuration of at least one of the UE, the source base station, or the target base station.

4. The method of claim 1, wherein a granularity of the timing offset is based at least in part on at least one of a numerology, or a slot length of the target base station.

5. The method of claim 1, wherein the target base station timing advance value is determined without performing a random access procedure.

6. The method of claim 1, wherein the target base station timing advance value is determined based at least in part on the information identifying the timing offset, the timing difference between the target base station and the source base station, and the source base station timing advance value.

7. A method of wireless communication performed by an apparatus of a user equipment (UE), comprising:
    transmitting information identifying a reference signal timing difference (RSTD) between a target base station and a source base station associated with a handover; and
    receiving information identifying a target base station timing advance value, wherein the information identifying the target base station timing advance value is based at least in part on the RSTD between the target base station and the source base station.

8. The method of claim 7, wherein the handover is performed without performing a random access procedure.

9. The method of claim 7, wherein the information identifying the RSTD between the target base station and the source base station is a quantization of the timing difference between the target base station and the source base station.

10. The method of claim 7, wherein the information identifying the RSTD between the target base station and the source base station is provided in a radio resource management report.

11. A method of wireless communication performed by an apparatus of a target base station, comprising:
    receiving, from a user equipment (UE), information identifying a reference signal timing difference (RSTD) between the apparatus of the target base station and a source base station, wherein the apparatus of the target base station and the source base station are associated with a handover of the UE; and
    providing, to the UE, information identifying a target base station timing advance value, wherein the target base station timing advance value is based at least in part on the information identifying the RSTD between the apparatus of the target base station and the source base station.

12. The method of claim 11, wherein the information identifying the RSTD between the apparatus of the target base station and the source base station is a quantization of the RSTD between the apparatus of the target base station and the source base station.

13. The method of claim 11, wherein the information identifying the RSTD between the apparatus of the target base station and the source base station is received in a radio resource management report.

14. The method of claim 11, further comprising:
determining the target base station timing advance value based at least in part on the information identifying the RSTD between the apparatus of the target base station and the source base station.

15. The method of claim 11, wherein providing, to the UE, information identifying the target base station timing advance value further comprises:
providing, to the source base station to be transmitted to the UE, the information identifying the target base station timing advance value.

16. The method of claim 11, wherein the handover is performed without performing a random access procedure.

17. An apparatus of a user equipment (UE) for wireless communication, comprising:
a first interface configured to output information identifying a reference signal timing difference (RSTD) between a target base station and a source base station associated with a handover; and
a second interface configured to obtain information identifying a target base station timing advance value, wherein the information identifying the target base station timing advance value is based at least in part on the RSTD between the target base station and the source base station.

18. The apparatus of claim 17, wherein the handover is performed without performing a random access procedure.

19. The apparatus of claim 17, wherein the information identifying the RSTD between the target base station and the source base station is a quantization of the RSTD between the target base station and the source base station.

20. The apparatus of claim 17, wherein the information identifying the RSTD between the target base station and the source base station is provided in a radio resource management report.

21. The method of claim 1, wherein the target base station timing advance value is determined based at least in part on adding the information identifying the timing offset, the timing difference between the target base station and the source base station, and the source base station timing advance value.

22. The method of claim 7, further comprising:
determining the RSTD between the target base station and the source base station using respective reference signals of the target base station and the source base station.

23. The method of claim 11, wherein the target base station timing advance value is based at least in part on a timing offset associated with uplink (UL) and downlink (DL) communications of the UE, the RSTD between the apparatus of the target base station and the source base station, and a source base station timing advance value.

24. The apparatus of claim 17, further comprising:
one or more processors to determine the RSTD between the target base station and the source base station using respective reference signals of the target base station and the source base station.

* * * * *